United States Patent
Masters

(10) Patent No.: US 10,878,353 B2
(45) Date of Patent: Dec. 29, 2020

(54) AUTOMATED COST ASSESSMENT OF CLOUD COMPUTING RESOURCES

(75) Inventor: Jonathan Masters, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 1416 days.

(21) Appl. No.: 13/149,705

(22) Filed: May 31, 2011

(65) Prior Publication Data

US 2012/0310765 A1    Dec. 6, 2012

(51) Int. Cl.
*G06Q 10/06* (2012.01)
*G06F 9/50* (2006.01)
*G06F 9/48* (2006.01)

(52) U.S. Cl.
CPC ..... *G06Q 10/06312* (2013.01); *G06F 9/4856* (2013.01); *G06F 9/5088* (2013.01); *Y02D 10/00* (2018.01)

(58) Field of Classification Search
None
See application file for complete search history.

(56) References Cited

U.S. PATENT DOCUMENTS

| | | | | |
|---|---|---|---|---|
| 6,965,878 | B1 * | 11/2005 | Heuring | 705/38 |
| 7,984,156 | B2 * | 7/2011 | Gauthier et al. | 709/226 |
| 8,086,544 | B2 * | 12/2011 | Boss et al. | 705/400 |
| 8,140,666 | B2 * | 3/2012 | Dias et al. | 709/224 |
| 8,224,993 | B1 * | 7/2012 | Brandwine | 709/244 |
| 8,959,173 | B1 * | 2/2015 | Robidoux | G06F 9/5088 709/201 |
| 2003/0130894 | A1 * | 7/2003 | Huettner et al. | 705/14 |
| 2003/0229580 | A1 * | 12/2003 | Gass et al. | 705/38 |
| 2005/0165925 | A1 * | 7/2005 | Dan et al. | 709/224 |
| 2005/0182675 | A1 * | 8/2005 | Huettner | 705/14 |
| 2007/0133484 | A1 * | 6/2007 | Albal et al. | 370/338 |
| 2009/0089142 | A1 * | 4/2009 | Boesch et al. | 705/10 |
| 2010/0094948 | A1 * | 4/2010 | Ganesh et al. | 709/212 |
| 2010/0114744 | A1 * | 5/2010 | Gonen | 705/35 |
| 2010/0192157 | A1 * | 7/2010 | Jackson | 718/104 |
| 2010/0228861 | A1 * | 9/2010 | Arsovski et al. | 709/226 |
| 2010/0287548 | A1 * | 11/2010 | Zhou et al. | 718/1 |
| 2011/0035243 | A1 * | 2/2011 | Shah et al. | 705/7 |
| 2011/0153715 | A1 * | 6/2011 | Oshins et al. | 709/203 |
| 2011/0213669 | A1 * | 9/2011 | Vojnovic | G06Q 10/06 705/14.71 |
| 2011/0264657 | A1 * | 10/2011 | Hoffman et al. | 707/728 |
| 2011/0296023 | A1 * | 12/2011 | Ferris et al. | 709/226 |
| 2012/0179824 | A1 * | 7/2012 | Jackson | 709/226 |

* cited by examiner

*Primary Examiner* — Jamie R Kucab
(74) *Attorney, Agent, or Firm* — Lowenstein Sandler LLP

(57) ABSTRACT

A method and system for automatic cost assessment of cloud computing resources. A cloud management server computer manages data centers in a smart cloud computing system that provisions computing resources to consumers. The cloud management server computer registers conditions of interest with multiple news sources, receives reports regarding the conditions of interest from one or more of the news sources, and automatically estimates a cost of operating each of the data centers based on the reports. Among the data centers, a first data center is estimated to have a cost increase because of a condition that is reportedly about to occur. The cloud management server computer automatically migrates workload from the first data center to a different data center before the condition occurs.

21 Claims, 6 Drawing Sheets

US 10,878,353 B2

AUTOMATED COST ASSESSMENT OF CLOUD COMPUTING RESOURCES

TECHNICAL FIELD

Embodiments of the present invention relate to computer systems, and more specifically, to management of cloud computing systems.

BACKGROUND

Cloud computing enables an end-user to utilize computing resources without knowledge of, or control over, the underlying infrastructure. These computing resources may include networks, servers, storage, applications, and services. Using the resources delivered by a cloud computing system, an enterprise can run applications and receive services without investing a large capital on computer hardware or software licenses.

Typically, the underlying infrastructure of a cloud computing system includes one or more data centers. Each data center hosts a large number of server computers and data storage. The operating costs of these data centers, with respect to heat dissipation and power usage, can be substantial.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1A:
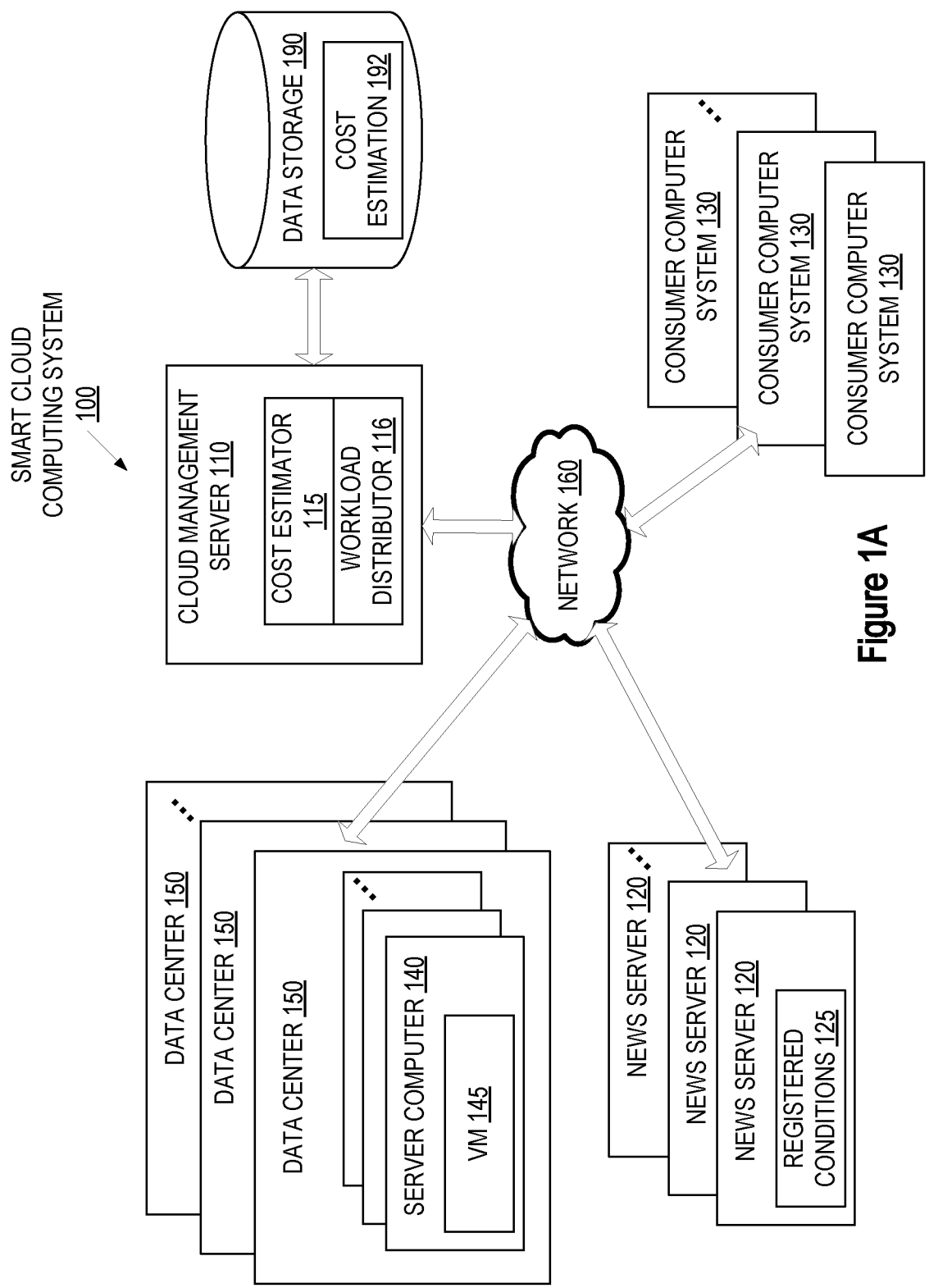
FIG. 1A is a block diagram of a network architecture in which an embodiment of a cloud management server may operate.

Described herein is a method and system for automatic cost assessment of cloud computing resources. In one embodiment, a cloud management server computer manages data centers in a smart cloud computing system that provisions computing resources to consumers. The cloud management server computer registers conditions of interest with multiple news sources, receives reports regarding the conditions of interest from one or more of the news sources, and automatically estimates a cost of operating each of the data centers based on the reports. Among the data centers, a first data center is estimated to have a cost increase due to an impending occurrence of a condition. The cloud management server computer automatically migrates workload from the first data center to a different data center before the condition occurs.

Embodiments of the present invention utilize automated data sources to gather up-to-date information, and assess (or estimate) the cost of operating each data center. The cost assessment factors in environmental concerns (e.g., weather, climate, political tensions, cost of power generation, cost of carbon credits to be purchased, etc.) when choosing a data center to deploy a workload. When the cost of operating a data center increases, the workload deployed at that data center can be automatically migrated to another data center. For example, migration of a workload may automatically occur when the weather forecast predicts severe weather at a data center. Migration of a workload may also automatically occur during a time period when electricity consumed by a data center is generated by a high-carbon-footprint source (e.g., coal) and requires (e.g., by the government) purchasing of carbon credits or other offsets. The migration may be on a global scale. In one embodiment, a corporation may use multiple data centers in each continent and migrate workloads between regions, countries, or continents. For example, the corporation may host its workload today in China because a particular Chinese dam is producing excess power that can be automatically purchased at a low rate. Whereas tomorrow the corporation may host its workload in Oregon, U.S., near the Gorge where there is a large hydroelectric dam producing excess power.

Embodiments of the present invention also allow trading of commoditized cloud computing resources. A cloud exchange system can be set up for buying and selling of cloud computing resources. In this scenario, the data centers are owned by multiple cloud providers. Since not all of the cloud providers are equal (e.g., in terms of bandwidth, redundancy, and other capabilities), the cloud exchange system can apply a weighting to each cloud provider, similarly to the "credit rating" given on the bond or stock market. This credit rating may factor in the cost assessment mentioned above, and may additionally factor in independent assessment from a third party rating agency. Each cloud provider can register with the exchange and consumers (e.g., companies, or automated software processes) can bid on the registered computing resources.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1A is a block diagram that illustrates a network architecture in which an embodiment of a smart cloud computing system 100 may operate. The smart cloud computing system 100 includes a cloud management server 110 coupled to a number of data centers 150 via a network 160. In one embodiment, the cloud management server 110 is a server computer or multiple server computers. Each data center 150 includes a large number of server computers 140 that provide computing resources to users of cloud computing. The computing resources include services, applications, data storage, central processing unit (CPU) time, etc. In one embodiment, the data centers 150 provision virtual machines 145 on request, such that the user of each virtual machine can run a different operating system and/or a different machine configuration. In one embodiment, the data centers 150 are spread over the globe and some of the data centers 150 may be located in different countries and/or different continents.

In one embodiment, a number of consumer computer system ("consumers") 130 are coupled to the data centers 150 via the network. Each consumer 130 may be a computer system that has limited computing resources and relies on the smart cloud computing system 100 to provide needed resources. For example, each consumer 130 may be a computer (e.g., a server, a workstation, a personal computer (PC), a laptop, etc.) or a number of computers, a mobile phone, a hand-held computing device, a game station, a personal digital assistant (PDA), a global positioning system (GPS) device, etc. The consumers 130 utilize the computing resources provided by the data centers 150, not necessarily knowing the geographical locations of the data centers 150.

In one embodiment, the network 160 may include one or more of the following: a private network (e.g., a local area network (LAN), a WAN, intranet, etc.) or a public network (e.g., the Internet).

According to one embodiment of the present invention, the cloud management server 110 is also coupled to multiple news sources (e.g., news servers 120) via the network 160. The cloud management server 110 registers conditions of interest with the news servers 120 as registered conditions 125, and collects information of the registered conditions 125 from the news servers 120. The cloud management server 110 includes a cost estimator 115 that estimates the cost of operating each data center 150 based on the collected information, and a workload distributor 116 to distribute workload based on the cost estimates. In one embodiment, the cloud management server 110 may be operated by a cloud provider that has a proprietary interest in the data centers 150 and desires to optimize the cost of running the data centers 150.

In one embodiment, the cloud management server 110 may use fixed costs for one or more of the data centers 150, required reliability, customer service requirements, risk of service interruption, and the cost of migration, in order to distribute workload based on cost estimates. The cloud management server 110 may calculate the fixed cost of data center resources (power, lighting, staffing, temperature control, etc.) and may determine the required business reliability of service (e.g., amount of time disruption is acceptable). The cloud management server 110 may also determine the customer service requirements for the services (e.g., the service/reliability promised to the customer). For example, a customer may pay a lower cost for services, in exchange for a greater risk of service disruption and/or loss of data. In addition, the cloud management server 110 may use news reports (e.g., reports of natural disasters, weather, terrorists threats, etc.) to further assess the risk of service interruption. The risks may be divided into various categories (e.g., high risk for incoming tornado, medium risk for terrorist threat, and low risk for rainy weather). Lastly, the cloud management server 110 may determine the overall cost of migrating resources. If the cost of migration is lower than the risk of service interruption, then the migration proceeds. In certain embodiments, services and/or workloads may be migrated into data centers which may be affected by an emergency (e.g., at risk data centers). For example, lower priority workloads (e.g., video processing) may be migrated into affected data center because the workload may be easily recovered (e.g., video processing can be re-done). The above examples are provided for illustration only and various other steps and/or methods for calculating costs and/or risks of migration are possible, without loss of generality.

In one embodiment, the cost estimates are stored as cost estimation 192 in a data storage 190 coupled to the cloud management server 110. The data storage 190 may comprise mass storage devices, such as magnetic or optical storage based disks, tapes, hard drives or flash drives. In an alternative embodiment, the cost estimation 192 may be stored in an internal memory device (e.g., Random Access Memory (RAM)) of the cloud management server 110.

In one embodiment, each news server 120 monitors the registered conditions 125 and informs the cloud management server 110 of updates to the registered conditions 125. In one embodiment, the news servers 120 may be operated by a weather bureau, a news organization, an electrical power supplier, a government agency, and any organizations that inform the public of news relevant to the operation of the data centers 150. Each news server 120 may be one or more server computers.

In one embodiment, the registered conditions 125 include the conditions that are relevant to the operation of the data centers 150. For example, the registered conditions 125 concerning a particular data center may include one or more of the following conditions at the particular data center: the cost of electricity, the power usage, the capacity and stability of power supply (e.g., excess power, power shortage or power outage), the local climate, the weather forecast, the $CO_2$ emission requirement and cost, the type of power generation (coal, wind, hydro, etc), etc. The cloud management server 110 can register any numbers of these conditions with each news server 120. The information sent back from the news server 120 may be a current condition, a condition forecast, or a combination of both. For example, the news server 120 may report a current weather and a weather forecast for the next 5 days, current cost of electricity and a scheduled rate increase of electricity that is taking effect in a month, a current $CO_2$ emission cost and a likely change in the $CO_2$ emission standard, etc.

Based on the reports of the news servers 120, the workload distributor 116 of the cloud management server 110 can proactively adjust workload distribution before a condition change actually occurs. For example, if the weather forecast indicates that, within the next 24 hours, a severe wind storm is going to hit an area where a first data center is located, the cloud management server 110 will migrate the workload from the first data center to a different location before the storm arrives to avoid a high possibility of power outage. If the weather forecast indicates that the region in which a second data center is located is going to be unseasonably cold (but otherwise calm), the cloud management server 110 can increase the workload deployed to the second data center in anticipation of low cooling cost. In one embodiment, the cloud management server 110 may adjust the workload based on a cost threshold: if the estimated cost of operating the data center 150 exceeds the cost threshold, then the workload of that data center 150 will be migrated to a different data center 150. In one embodiment, the data center 150 to which the workload migrates is the one that has the lowest estimated cost.

Figure 1B:
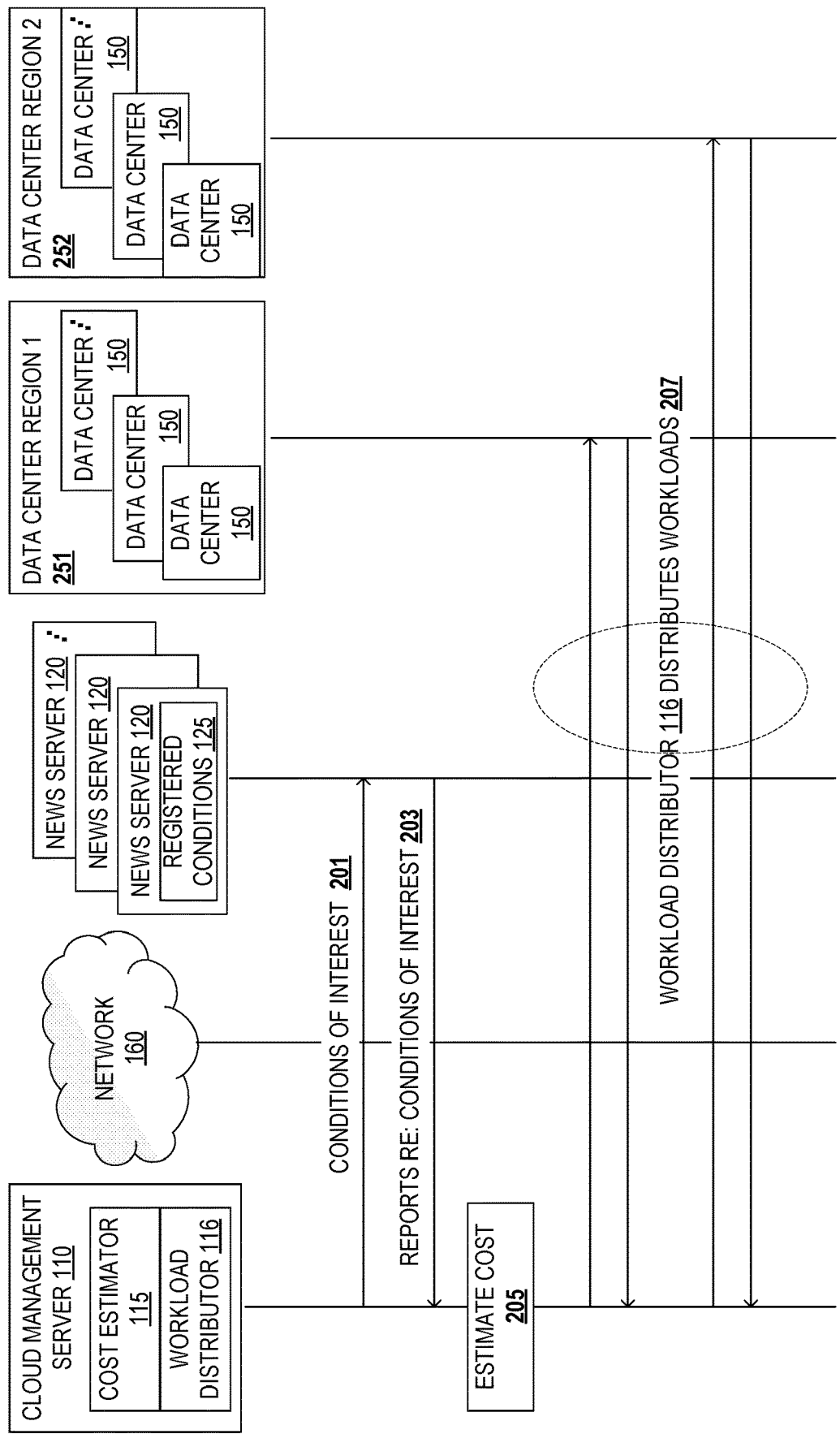
FIG. 1B is a flow diagram illustrating the transfer of data between entities illustrated in FIG. 1A.

FIG. 1B illustrates the transfer of data between entities illustrated in FIG. 1A. At operation 201, the cloud management server computer 110 registers conditions of interest with multiple news sources 120 over the network 160. These conditions of interest are stored as registered conditions 125. At operation 203, the cloud management server 110 receives reports regarding the conditions of interest from the news servers over the network 160. Based on these reports, at operation 205, the cloud management server's cost estimator 115 automatically estimates the cost of operating each data center 150. In one embodiment, Data Center Region 1 (251) is estimated to have a lower cost, while Data Center Region 2 (252) is estimated to have a cost increase due to an impending occurrence of a condition, for example.

At operation 207, via the network 160, the cloud management server's workload distribution 116 distributes the workload between Data Center Region 1 (251) and Data Center Region 2 (252) based on the estimated cost of operating each data center region, which may include fixed costs of data center resources, customer service requirements, required business reliability of service, risk of service interruption based on news reports, and/or the overall cost of migrating resources. When the cost of operating a data center region increases, the workload deployed at that data center region can be automatically migrated to another data center region. For example, high priority data will automatically be migrated from the data center region with the higher cost of operation to the data center region with the lower cost of operation, while low priority data may be migrated to a data center region that has a higher cost of operation (i.e., a higher risk data center region) because low priority data is easier to recover.

Figure 2:
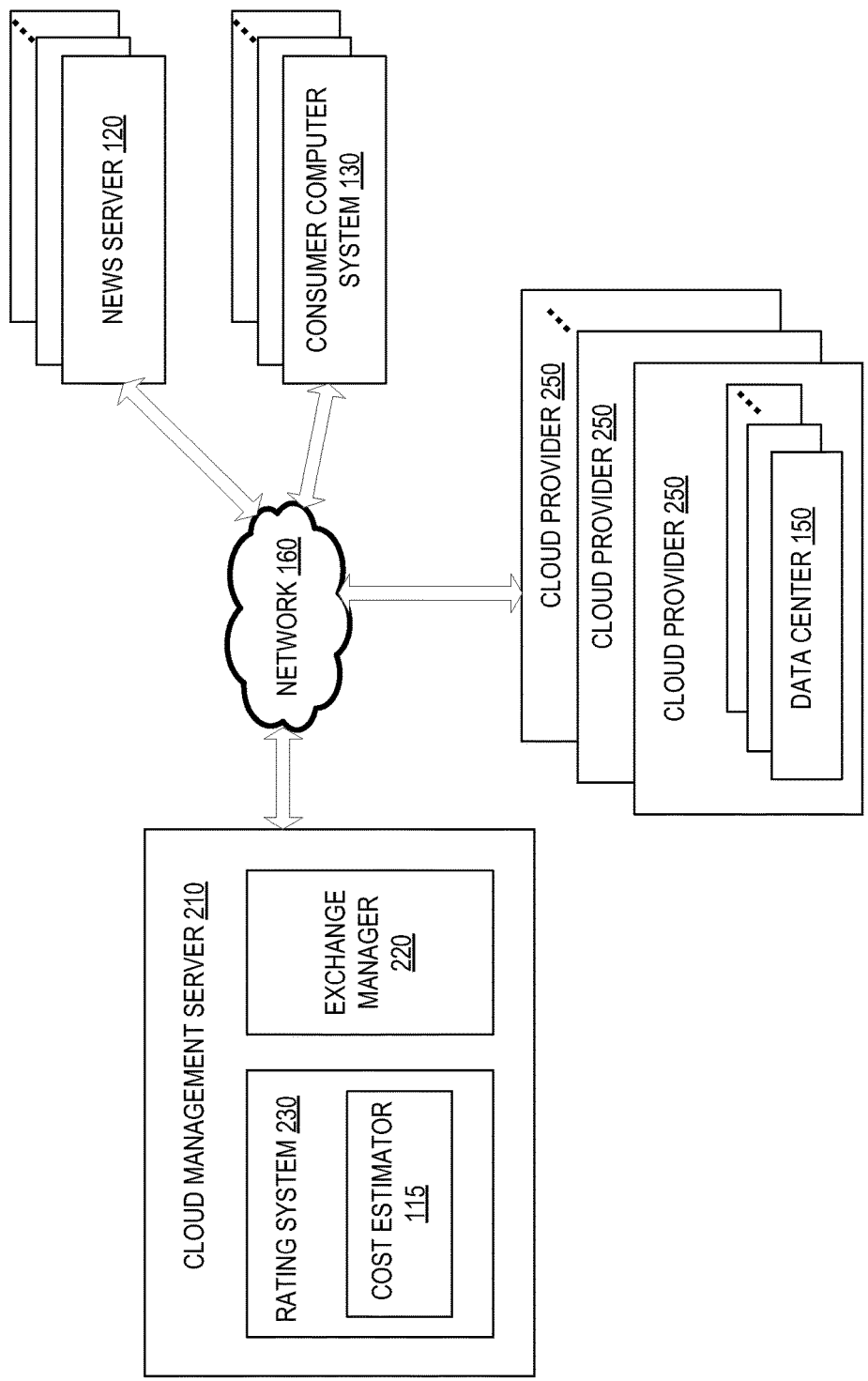
FIG. 2 is a block diagram illustrating an alternative embodiment of a cloud management server.

FIG. 2 is a block diagram that illustrates another embodiment of a cloud management server 210, which can be one or more server computers. In this embodiment, the cloud management server 210 includes an exchange manager 220 that mediates the exchange (e.g., buy and sell) of computing resources (e.g., time units, storage units, etc.). In one embodiment, the cloud management server 210 may be one or more server computers.

In the embodiment of FIG. 2, the data centers 150 are operated by multiple cloud providers 250 and the cloud management server 210 is operated by an entity independent of the cloud providers 250. Each cloud provider 250 operates one or more of the data centers 150 and registers the computing resources of its data centers 150 with the cloud management server 210. The consumers 130 may place bids on the registered resources and trade the registered resources in the same way as trading commodities in a commodity exchange or shares of stock in a stock exchange.

In one embodiment, the exchange manager 220 posts online a floor price for the available units of computing resources offered by a seller (e.g., one of the cloud providers 250), as well as bids placed by the consumers 130. The exchange manager 220 also polices when an outstanding offer expires. The exchange manager 220 serves as an intermediate such that units of computing resources can change hands without any direct contact between sellers and bidders.

In one embodiment, the computing resources from different cloud providers 250 may be given different weightings; that is, a time unit from cloud provider A may be traded at a higher price than a time unit from cloud provider B. This may be the case when cloud provider A is perceived to be more stable, more reliable, provides better service or performance, etc. In one embodiment, the price of a unit provided by each cloud provider 250 is positively correlated with a credit rating of the cloud provider 250. That is, if the cloud provider 250 has a high credit rating, its unit price can be traded higher than another cloud provider 250 who has a low credit rating. In one embodiment, the credit rating is set by a rating system 230, which may be part of the cloud management server 110 as shown in FIG. 2. In an alternative embodiment, the rating system 230 may be operated by a third party and include server computers that are separate from, but are communicatively coupled to, the cloud management server 110 over the network 160.

In one embodiment, the rating system 230 includes the cost estimator 115 described above with reference to FIG. 1A. Similar to the description of FIG. 1A, the rating system 230 uses the cost estimator 115 to generate a cost estimate for each data center 150 based on the information reported from the news servers 120. The rating system 230 then sets the credit rating of each cloud provider 250 based on the cost estimates of the data centers 150 owned by the cloud provider 250. The credit rating of each cloud provider 250 may be an indicator of its stability, solvency, capacity, performance and/or service quality.

Figure 3:
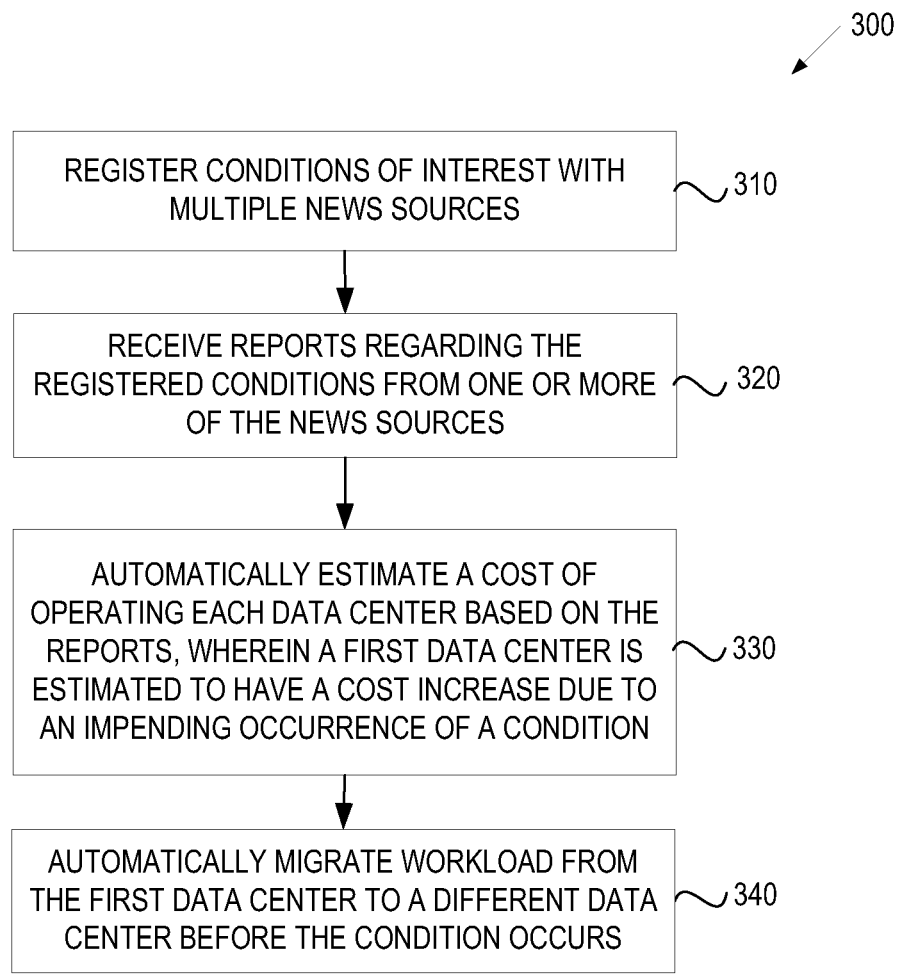
FIG. 3 is a flow diagram of one embodiment of a method for distributing workload among data centers based on estimated costs.

FIG. 3 is a flow diagram illustrating one embodiment of a method 300 for a smart cloud computing system that automatically distributes workload to data centers to optimize the overall operating cost. The method 300 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 300 is performed by the cloud management server 110 of FIG. 1A.

Referring to FIG. 3, in one embodiment, the method 300 begins when the cloud management server 110 registers conditions of interests with news sources (e.g., the news servers 120) (block 310). An initial registration may occur when the cloud management server 110 starts up. Subsequent updates to the registration may occur when any one of the data centers 150 starts up, when a new news source becomes available, or when new conditions of interest need to be added to the existing conditions. The cloud management server 110 receives reports regarding the registered conditions 125 from one or more of the new sources, on a periodic basis and/or whenever there is an update to the registered conditions 125 (block 320). Based on the received reports, the cloud management server 110 automatically estimates the cost of operating each of the data centers 150 (block 330). Based on the cost estimates, the cloud management server 110 automatically distributes workload among the data centers 150, taking into consideration the estimated runtime of each task in the workload. In particular, if one of the data centers 150 ("the first data center") is estimated to have a cost increase due to an impending occurrence of a condition (e.g., severe weather, power shortage, etc.), the cloud management server 110 will migrate the workload from the first data center to another data center (block 340); e.g., a data center that has the lowest estimated cost. In one scenario, the cloud management server 110 may maximize the workload that is assigned to the data centers 150 having the lowest cost (e.g., low power, power generated cleanly, with no forecast of severe weather or shortage of power supply, etc.), and then assign the rest of the workload to the data centers 150 having higher costs.

Figure 4:
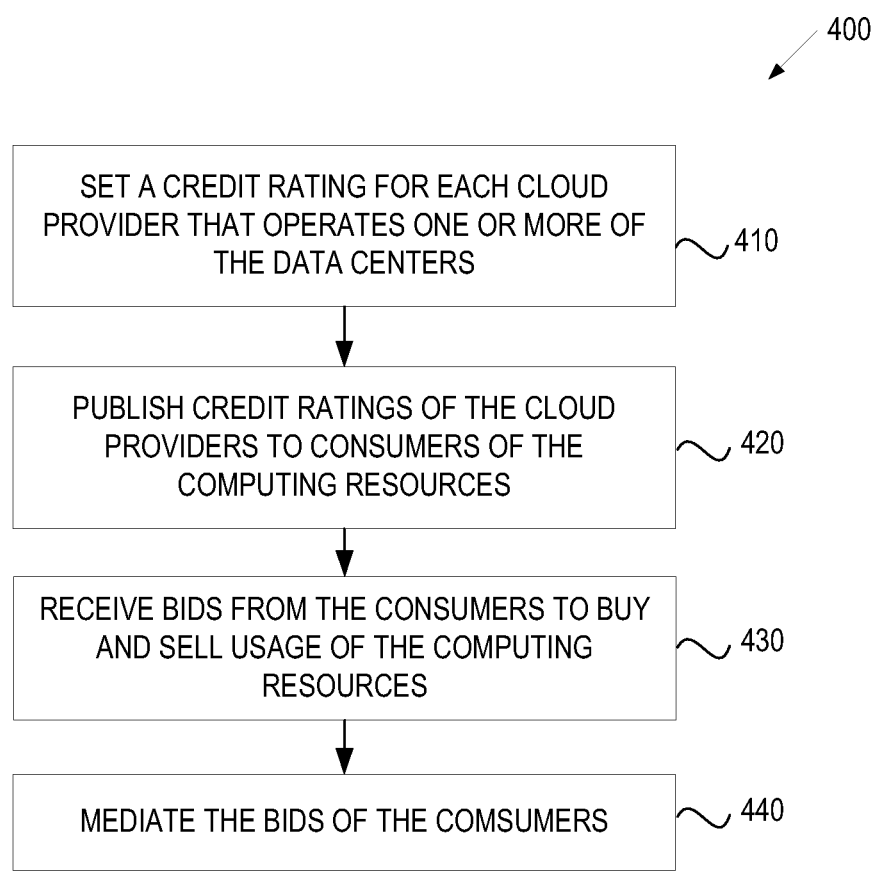
FIG. 4 is a flow diagram of one embodiment of a method for managing an exchange of cloud computer resources.

FIG. 4 is a flow diagram illustrating one embodiment of a method 400 for a smart cloud computing system to manage an exchange of cloud computing resources. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the cloud management server 210 of FIG. 2.

Referring to FIG. 4, in one embodiment, the method 400 begins when the cloud management server 210 sets a credit rating for each cloud provider 250 (block 410). As described above, the cloud management server 210 may determine the credit rating for a given cloud provider based, at least in part, on the estimated cost of operating the data center 150 owned by that given cloud provider. Alternatively, the cloud management server 210 may receive the credit ratings from a third parting rating system. The cloud management server 210 publishes the credit ratings to the consumers 130 (block 420), and receives bids from the consumers 130 for buying and selling usage of the cloud computing resources (block 430). The cloud management server 210 then mediates the bids of the consumers (block 440) to enforce the policies of a fair exchange.

Figure 5:
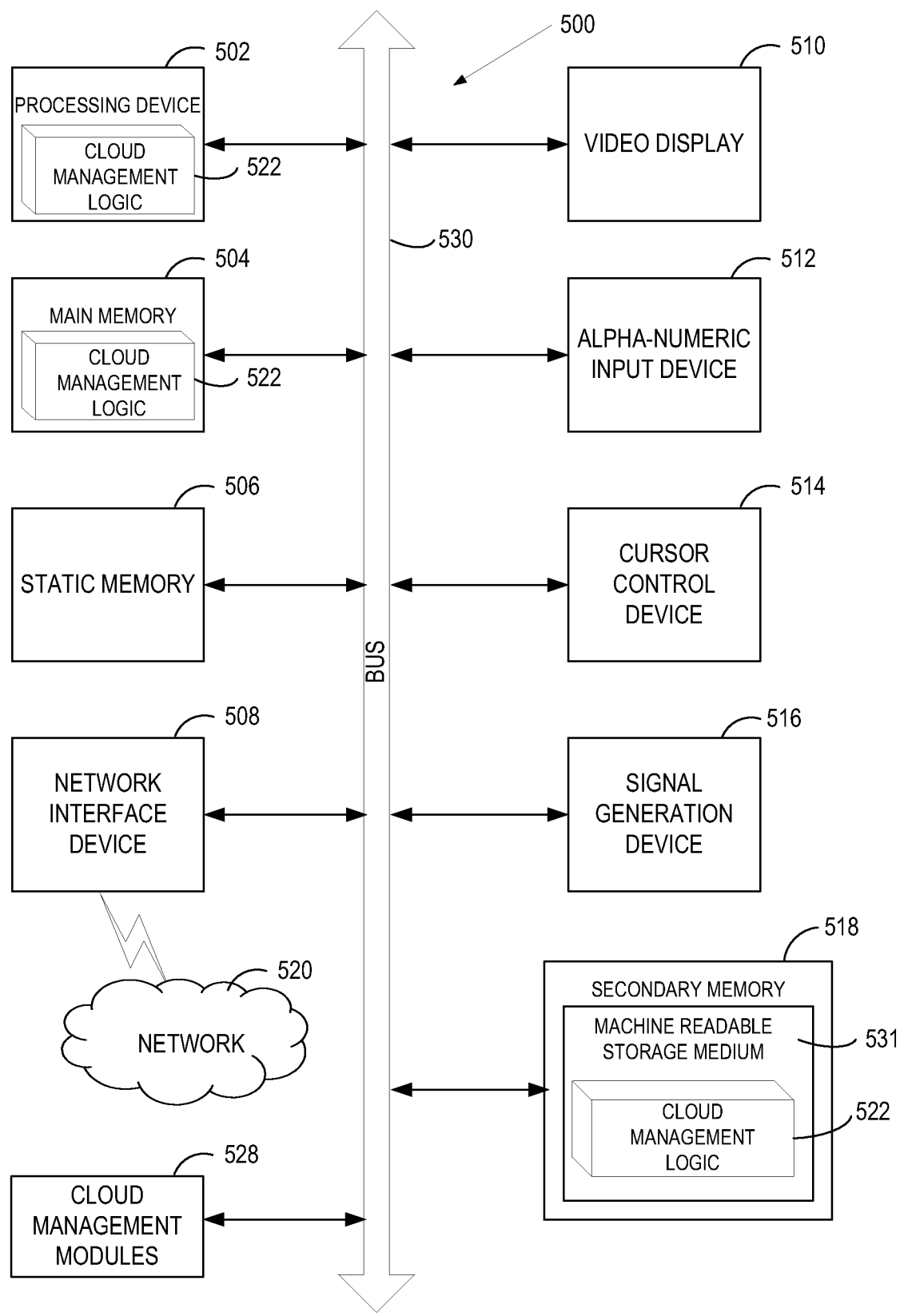
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute cloud management logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., cloud management logic 522) embodying any one or more of the methodologies or functions described herein (e.g., the cloud management servers 110 and 210 of FIGS. 1A, 1B and 2). The cloud management logic 522 may also reside, completely or at least partially, within the main memory 504 and/or within the processing device 502 during execution thereof by the computer system 500; the main memory 504 and the processing device 502 also constituting machine-readable storage media. The cloud management logic 522 may further be transmitted or received over a network 520 via the network interface device 508.

The machine-readable storage medium 531 may also be used to store the cloud management logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include cloud management modules 528 for implementing the functionalities of the cloud management servers 110 and 210 of FIGS. 1A, 1B and 2. The module 528, components and other features described herein (for example in relation to FIGS. 1A, 1B and FIG. 2) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "registering", "receiving", "estimating", "migrating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for optimizing distribution of workloads within a cloud computing system, the method comprising:
registering, by a processing device of a cloud management server computer, conditions of interest with multiple news sources, the cloud management server computer managing a plurality of data centers of a plurality of cloud providers at a plurality of data center regions in the cloud computing system that provisions computing resources of the plurality of data centers to consumers based, at least in part, on bids of the consumers for the computing resources of the plurality of data centers, wherein the conditions of interest comprise at least one of power usage, capacity of power supply or weather forecast in each of the plurality of data center regions;
receiving, by the cloud management server computer, reports regarding the conditions of interest from one or more of the news sources, wherein the reports indicate a change of the conditions in one or more data center regions;
in response to receiving the reports regarding the conditions of interest from the one or more of the news sources, calculating, by the cloud management server computer, a future power and electricity usage in the plurality of data centers in each of the plurality of data center regions based on the reports of the one or more of the news sources;
determining, based on the calculated future power and electricity usage in each of the plurality of data centers in each of the data center regions, that reliability of a first plurality of data centers of a first data center region of the plurality of data center regions is to be reduced because of the change of the condition that is about to occur according to the reports of the one or more of the news sources, a reduced reliability resulting in a likelihood of service interruption in the first plurality of data centers in the first data center region changing from a low level to a high level, the first plurality of data centers having a first plurality of workloads;
identifying a second data region of the plurality of data center regions, wherein the second data center region is not affected by the change of the conditions, the second data center region having a second plurality of data centers with a second plurality of workloads;
identifying, among the second plurality of workloads in the second plurality of data centers, low priority workloads; and
before the change of the conditions occurs, adjusting, by the processing device of the cloud management server computer, workloads among the first plurality of data centers of the first data center region and the second plurality of data centers of the second data center region, wherein the adjusting comprises automatically migrating the first plurality of workloads from the first plurality of data centers of the first data center region to the second plurality of data centers of the second data center region, and automatically migrating the low priority workloads from the second plurality of data centers of the second data center region to the first plurality of data centers of the first data center region, in order to optimize the distribution of workloads within the cloud computing system.

2. The method of claim 1, wherein the conditions of interest further comprise at least one of: a cost of electricity, or a stability of power supply at each of the data centers.

3. The method of claim 1, wherein the conditions of interest further comprise a local climate at each of the data centers.

4. The method of claim 1, wherein the conditions of interest further comprise: the type of power generation or the cost of $CO_2$ emission at each of the data centers.

5. The method of claim 1, further comprising:
setting credit ratings of the plurality of cloud providers;
publishing the credit ratings to the consumers; and
receiving the bids, which are based on the credit ratings, from the consumers to buy and sell usage of the computing resources.

6. The method of claim 5, wherein setting credit ratings further comprises:
determining a credit rating for a given cloud provider based, at least in part, on the cost of operating the data centers owned by the given cloud provider.

7. The method of claim 1, wherein the change of conditions comprises at least one of power shortage, power outage, or local climate forecast.

8. A system for optimizing distribution of workloads within a cloud computing system, the system comprising:
a processing device; and
a non-transitory computer readable medium comprising executable instructions that when executed by the processing device cause the processing device to:
manage a plurality of data centers of a plurality of cloud providers at a plurality of data center regions in the cloud computing system that provisions computing resources of the plurality of data centers to consumers based, at least in part, on bids of the consumers for the computing resources of the plurality of data centers;

register conditions of interest with multiple news sources, wherein the conditions of interest comprise at least one of power usage, capacity of power supply or weather forecast in each of the plurality of data center regions;

receive reports regarding the conditions of interest from one or more of the news sources, wherein the reports indicate a change of the conditions in one or more data center regions;

in response to receiving the reports regarding the conditions of interest from the one or more of the news sources, calculate a future power and electricity usage in the plurality of data centers in each of the plurality of data center regions based on the reports of the one or more of the news sources, wherein computing resources of the plurality of data centers are distributed to consumers based, at least in part, on bids of the consumers for the computing resources of the plurality of data centers;

determine, based on the calculated future power and electricity usage in each of the plurality of data centers in each of the data center regions, that reliability of a first plurality of data centers of a first data center region of the plurality of data center regions is to be reduced because of the change of the condition that is about to occur according to the reports of the one or more of the news sources, a reduced reliability resulting in a likelihood of service interruption in the first plurality of data centers in the first data center region changing from a low level to a high level, the first plurality of data centers having a first plurality of workloads;

identify a second data region of the plurality of data center regions, wherein the second data center region is not affected by the change of the conditions, the second data center region having a second plurality of data centers with a second plurality of workloads;

identify, among the second plurality of workloads in the second plurality of data centers, low priority workloads; and before the change of the conditions occurs, adjust workloads among the first plurality of data centers of the first data center region and the second plurality of data centers of the second data center region, wherein the adjusting comprises automatically migrating the first plurality of workloads from the first plurality of data centers of the first data center region to the second plurality of data centers of the second data center region, and automatically migrating the low priority workloads from the second plurality of data centers of the second data center region to the first plurality of data centers of the first data center region, in order to optimize the distribution of workloads within the cloud computing system.

9. The system of claim 8, wherein the conditions of interest further comprise at least one of: a cost of electricity, or a stability of power supply at each of the data centers.

10. The system of claim 8, wherein the conditions of interest further comprise a local climate at each of the data centers.

11. The system of claim 8, wherein the conditions of interest further comprise: the type of power generation or the cost of CO2 emission at each of the data centers.

12. The system of claim 8, the processing device being further operable to:
set credit ratings of the plurality of cloud providers;
publish the credit ratings to the consumers; and
receive the bids, which are based on the credit ratings, from the consumers to buy and sell usage of the computing resources.

13. The system of claim 12, wherein a credit rating for a given cloud provider is determined, at least in part, based on the cost of operating the data centers owned by the given cloud provider.

14. The system of claim 8 wherein the change of conditions comprises at least one of power shortage, power outage, or local climate forecast.

15. A non-transitory computer readable storage medium including instructions that, when executed by a processing device, cause the processing device to perform a method for optimizing distribution of workloads within a cloud computing system, the method comprising:
managing a plurality of data centers of a plurality of cloud providers at a plurality of data center regions in the cloud computing system that provisions computing resources of the plurality of data centers to consumers based, at least in part, on bids of the consumers for the computing resources of the plurality of data centers;

registering, by the processing device, conditions of interest with multiple news sources, wherein the conditions of interest comprise at least one of power usage, capacity of power supply or weather forecast in each of the plurality of data center regions;

receiving, by the processing device, reports regarding the conditions of interest from one or more of the news sources, wherein the reports indicate a change of the conditions in one or more data center regions;

in response to receiving the reports regarding the conditions of interest from the one or more of the news sources, calculating a future power and electricity usage in the plurality of data centers in each of the plurality of data center regions based on the reports of the one or more of the news sources, wherein computing resources of the plurality of data centers are distributed to consumers based, at least in part, on bids of the consumers for the computing resources of the plurality of data centers;

determining, based on the calculated future power and electricity usage in each of the plurality of data centers in each of the data center regions, that the reliability of a first plurality of data centers of a first data center region of the plurality of data center regions is to be reduced because of the changes of the condition that is about to occur according to the reports of the one or more of the news sources, a reduced reliability resulting in a likelihood of service interruption in the first plurality of data centers in the first data center region changing from a low level to a high level, the first plurality of data centers having a first plurality of workloads;

identifying a second data region of the plurality of data center regions, wherein the second data center region is not affected by the change of the conditions, the second data center region having a second plurality of data centers with a second plurality of workloads;

identifying, among the second plurality of workloads in the second plurality of data centers, low priority workloads; and before the change of the condition occurs, adjusting workloads among the first plurality of data centers of the first data center region and the second plurality of data centers of the second data center region, wherein the adjusting comprises automatically migrating the first plurality of workloads from the first plurality of data centers of the first data center region to the second plurality of data centers of the second data center region, and automatically migrating the low priority workloads from the second plurality of data centers of the second data center region to the first plurality of data centers of the first data center region, in order to optimize the distribution of workloads within the cloud computing system.

16. The non-transitory computer readable storage medium of claim 15, wherein the conditions of interest further comprise at least one of: a cost of electricity, or a stability of power supply at each of the data centers.

17. The non-transitory computer readable storage medium of claim 15, wherein the conditions of interest comprise a local climate at each of the data centers.

18. The non-transitory computer readable storage medium of claim 15, wherein the conditions of interest further comprise: the type of power generation or the cost of CO2 emission at each of the data centers.

19. The non-transitory computer readable storage medium of claim 15, wherein the method further comprises:
setting credit ratings of the plurality of cloud providers;
publishing the credit ratings to the consumers; and
receiving the bids, which are based on the credit ratings, from the consumers to buy and sell usage of the computing resources.

20. The non-transitory computer readable storage medium of claim 19, wherein setting credit ratings further comprises:
determining a credit rating for a given cloud provider based, at least in part, on the cost of operating the data centers owned by the given cloud provider.

21. The non-transitory computer readable storage medium of claim 15, wherein the change of conditions comprises at least one of power shortage, power outage, or local climate forecast.

\* \* \* \* \*